UNITED STATES PATENT OFFICE.

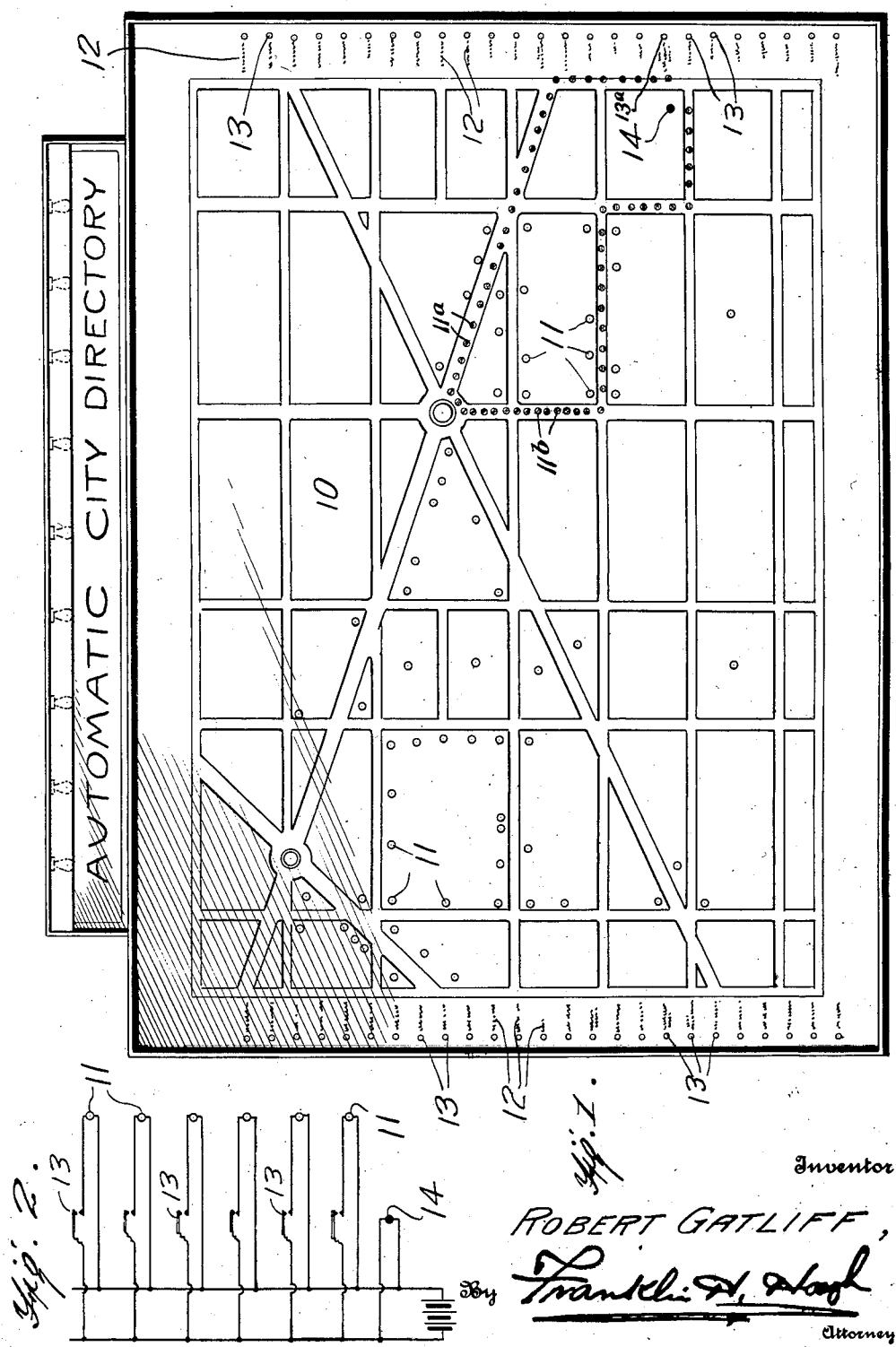

ROBERT GATLIFF, OF MIAMI, FLORIDA, ASSIGNOR OF ONE-HALF TO ROBERT R. REIMERT, JR., OF MIAMI, FLORIDA.

DIRECTORY.

1,409,894.   Specification of Letters Patent.   Patented Mar. 14, 1922.

Application filed June 21, 1921. Serial No. 479,335.

*To all whom it may concern:*

Be it known that I, ROBERT GATLIFF, a citizen of the United States, residing at Miami, in the county of Dade and State of Florida, have invented certain new and useful Improvements in Directories, of which the following is a specification, reference being had therein to the accompanying drawings.

This invention relates to directories and more especially to city directories and has for an object to provide a city directory which, upon the locating of a desired point in the index, will automatically disclose the location of said point upon a map.

A further object of the invention is to provide the combination of a city map with a directory of points of interest, the said points of interest being indicated on the map by electric lights, and with switches adjacent to the index, which, when pressed, will light a light at a point of interest on the map corresponding to the indexing thereof.

A further object of the invention is to provide a map, as, for instance of a city, with predetermined points of interest provided with electric lights normally unlighted, with an index or directory conveniently adjacent to the map and adjacent to the directory a plurality of push buttons operating as switches, which, when depressed will illuminate a location upon a map at a point corresponding to the indexed data adjacent to said push button.

With these and other objects in view the invention comprises certain novel features, elements, parts, functions and combinations as disclosed in the drawing, together with equivalents thereof, as will be hereinafter more fully described and claimed.

In the drawings:

Figure 1 is a view in elevation of a conventional map having directory data along its margin and with indications of push buttons and electric lights, the former at the directory, the latter upon the map, and Figure 2 is a diagrammatic view of the wiring of the lights and push buttons.

Like characters of reference indicate corresponding parts throughout the several views.

It is well known that among the difficulties experienced by strangers in a city is to locate relative to the point at which they are at the moment, a point of interest to which they wish to go. To one unacquainted with a city, for instance, the location of such a point is a matter of considerable difficulty, if not uncertainty, and any means by which the point can be instantly and correctly designated would be welcome to travelers and others unfamiliar with the location.

The present invention is capable of a very great number of embodiments and the illustration is intended only as a means of indicating the invention without in any way limiting the invention to the showing as found in the drawings.

In one form, and probably the preferred form, a map, as for instance of a city of considerable size, will be mounted for convenient inspection. Upon the map points of interest and any other points desired will be indicated by an electric light which will be properly inserted into a base in the map and properly wired in the manner hereinafter more fully described.

These maps, together with other features, may be located at various points, as for instance in railway stations, hotels, and the like and each will be provided with means for indicating upon a map the point at which the party is located who is seeking the information.

To apply the invention to the drawing without limiting the invention to any of the features of the drawing, it will be noted that a city map 10 is conveniently shown. At various points about this map a plurality of electric lights 11 are located. At any convenient point, as for instance along the margin of the map or map mounting an index or directory 12 will be located with push buttons 13, one convenient to each of the index entries. Located also upon the map will be a light 14 which will be energized when any of the switches indicated by the push buttons 13 are closed and will indicate the point at which the party seeking the information is located. The lamps 11 will, as will be apparent from an inspection, be connected one with each of the several push buttons, so that whenever one of the push buttons contiguous to an index entry is depressed, a corresponding lamp will be illuminated upon some part of the map and simultaneously the lamp 14 will be illuminated, so that the user noting the position upon the map then occupied by him, as indicated by the lamp 14, will be able to trace the necessary route from such point to the location of the lamp 11 and will thereby determine the shortest and quickest route for reaching his destination.

It is obvious that the device may be expanded into indicating most direct street routes by illuminating a plurality of varied colored lamps 11 which would indicate such route, the destination being one color and the foot route another color and another color which would indicate street car facilities which the user might employ to reach his destination from the point at which he was then located. It is also obvious that the lights may be, and preferably will be differently colored, as for instance, a red light at 14 to indicate the position of the user, while the lights 11 may be clear or frosted, while other lights for other purposes may be differently colored, as for instance, blue or green. It would be obvious that the invention is capable of use in many divergent ways, and the disclosure is only indicative of such use without attempting to specifically disclose wiring for routes whether by foot or street car traffic. An illustration of this use is shown as follows: Supposing that the button 13$^a$ closed a circuit to the large destination point 11 through green light 11$^a$ and blue lights 11$^b$ and through red light 14, the resultant of this making of the circuit by the pressure of the button 13$^a$ would be to indicate to the operator that he could select the street car route indicated by the green lights and walk practically a block to his destination point 11; or that he could follow the course indicated by the blue lights and walk substantially three blocks to the said destination without taking the street car.

It is also obvious that this invention may be arranged to operate in conjunction with any check-controlled apparatus and the invention is not limited to any function necessarily independent of check control apparatus.

It is also obvious that, while the description and the drawings disclose a city map that it may be as readily employed at various cross roads for vehicular traffic for indicating to the user not only his destination but his present location and most desirable route, and where more than one route is possible between points, different colored lights may be employed to indicate choices of routes.

It is also obvious that this may be employed as a directory for department stores, hotels, or other buildings with like facility.

It is also obvious that the indication of the location of the user by means of a light is not essential to the invention and that such location may be indicated by some permanent display indicia which will not be illuminated, and that only the point of destination or the destination and route will be illuminated and the destination and route determined from the point of location by the permanent indicia displayed for that purpose.

What I claim to be new is:

An automatic city directory comprising a map provided with a plurality of multicolored lights in series, a certain colored light indicative of a destination and a series of lights of another color indicative of a footpath to said destination and a series of lights of another color indicative of a street car route to said destination, an index, and means adjacent the index for making a circuit through said series.

In testimony whereof I hereunto affix my signature in presence of two witnesses.

ROBERT GATLIFF.

Witnesses:
R. M. MILLER,
C. H. SHOPE.